United States Patent
Hellmann et al.

(10) Patent No.: US 6,238,782 B1
(45) Date of Patent: May 29, 2001

(54) BIAXIALLY ORIENTED POLYESTER FILM HAVING MORE THAN ONE LAYER

(75) Inventors: Joerg Hellmann, Mainz; Gottfried Hilkert, Saulheim, both of (DE)

(73) Assignee: Mitsubishi Polyester Film GmbH, Wisebaden (DE)

( * ) Notice: Subject to any disclaimer, the term of this patent is extended or adjusted under 35 U.S.C. 154(b) by 0 days.

(21) Appl. No.: 09/389,017

(22) Filed: Sep. 2, 1999

(30) Foreign Application Priority Data

Sep. 2, 1998 (DE) ............................................. 198 39 848

(51) Int. Cl.$^7$ .............................. B32B 7/00; B32B 27/18; B32B 27/20; B32B 27/36; B32B 31/30
(52) U.S. Cl. .......................... 428/216; 428/212; 428/213; 428/215; 428/323; 428/480; 428/694 SG; 428/694 ST; 428/910; 264/171.11; 264/173.16; 264/289.3; 264/290.2
(58) Field of Search .................................. 428/212, 213, 428/215, 216, 323, 480, 694 SG, 694 ST, 910; 264/171.11, 173.16, 289.3, 290.2

(56) References Cited

U.S. PATENT DOCUMENTS

| | | |
|---|---|---|
| 3,515,626 | 6/1970 | Duffield . |
| 3,958,064 | 5/1976 | Brekken et al. . |
| 4,042,569 | 8/1977 | Bell et al. . |
| 4,252,885 | 2/1981 | McGrail et al. . |
| 4,399,179 | 8/1983 | Minami et al. . |
| 4,493,872 | 1/1985 | Funderburk et al. . |
| 4,615,939 | 10/1986 | Corsi et al. . |
| 4,622,237 | 11/1986 | Lori . |
| 5,236,680 | 8/1993 | Nakazawa et al. . |
| 5,236,683 | 8/1993 | Nakazawa et al. . |
| 5,242,757 | 9/1993 | Buisine et al. . |
| 5,429,785 | 7/1995 | Jolliffe . |
| 5,453,260 | 9/1995 | Nakazawa et al. . |
| 5,468,527 | 11/1995 | Peiffer et al. . |
| 5,478,632 | * 12/1995 | Kurz et al. ........................ 428/212 |
| 5,506,014 | 4/1996 | Minnick . |
| 5,612,138 | * 3/1997 | Kurz et al. ........................ 428/411.1 |
| 6,106,926 | * 8/2000 | Kurz et al. ........................ 428/141 |

FOREIGN PATENT DOCUMENTS

| | | |
|---|---|---|
| 1694404 | 4/1971 | (DE) . |
| 2230970 | 2/1973 | (DE) . |
| 3801535 | 7/1988 | (DE) . |
| 4306155 | 9/1994 | (DE) . |
| 0 035 835 | 9/1981 | (EP) . |
| 0 061 769 | 10/1982 | (EP) . |
| 0 088 635 | 9/1983 | (EP) . |
| 0 124 291 | 11/1984 | (EP) . |
| 0 135 451 | 3/1985 | (EP) . |
| 0 144 878 | 6/1985 | (EP) . |
| 0 236 945 | 9/1987 | (EP) . |
| 0 296 620 | 12/1988 | (EP) . |
| 0 347 646 | 12/1989 | (EP) . |
| 0 378 154 | 7/1990 | (EP) . |
| 0 378 955 | 7/1990 | (EP) . |
| 0 402 861 | 12/1990 | (EP) . |
| 0 490 665 | 6/1992 | (EP) . |
| 0 502 745 | 9/1992 | (EP) . |
| 0 514 129 | 11/1992 | (EP) . |
| 0 515 096 | 11/1992 | (EP) . |
| 0 580 404 | 1/1994 | (EP) . |
| 0 602 964 | 6/1994 | (EP) . |
| 0 604 057 | 6/1994 | (EP) . |
| 0 609 060 | 8/1994 | (EP) . |
| 0 612 790 | 8/1994 | (EP) . |
| 0 659 810 | 6/1995 | (EP) . |
| 0 663 286 | 7/1995 | (EP) . |
| 0 685 509 | 12/1995 | (EP) . |
| 0 707 979 | 4/1996 | (EP) . |
| 0 826 478 | 3/1998 | (EP) . |
| WO 94/13476 | 6/1994 | (WO) . |
| WO 94/13481 | 6/1994 | (WO) . |
| WO 98/13414 | 4/1998 | (WO) . |
| WO 98/13415 | 4/1998 | (WO) . |
| WO 88/10188 | 12/1998 | (WO) . |

OTHER PUBLICATIONS

Kimura, S.F. et al., FTIR Spectroscopic Study on Crystallization Process of Poly (ethylene–2,6–naphthalate), 35 Journal of Polymer Science: Polymer Physics 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9615, Derwent Publications Ltd., London, GB; Class A23, AN 96–148338, XP002114377 & JP 08 03679 A (Toray Indus., Inc.) (Feb. 6, 1996).

Database WPI, Section Ch, Week 9522, Derwent Publications Ltd., London, GB; Class A32, AN 95–166886, XP002114408 & JP 07 088592 A (Toray Indus., Inc.) (Apr. 4, 1995).

Weiss, J., Parameters that influence the barrier properties of metallized polyester and polypropylene films, 204 Thin Solid Films 203–216 (1991).

Derwent Abstract, Acc. No. 98–194495/199818 (DE 9813415 and DE 9813414).

* cited by examiner

Primary Examiner—Vivian Chen
(74) Attorney, Agent, or Firm—Finnegan, Henderson, Farabow, Garrett & Dunner, L.L.P.

(57) ABSTRACT

The invention relates to a three-layer, biaxially oriented polyester film which has better abrasion properties than prior art films, together with very good electromagnetic properties. The structure on the two sides of the film in composed of at least one base layer B and, applied to this base layer, outer layers A and C, wherein the outer layer A has a roughness gas flow greater than 1000 sec and less than 2000 sec, and the outer layer C has a roughness profile gas flow of less than 600 sec. The invention further relates to a process for producing the film, and to its use as a magnetic tape film.

30 Claims, No Drawings

BIAXIALLY ORIENTED POLYESTER FILM HAVING MORE THAN ONE LAYER

FIELD OF THE INVENTION

Biaxially oriented polyester film having more than one layer, process for its production, and its use as a magnetic tape film with optimized electromagnetic properties and winding performance.

The invention relates to an at least three-layer, biaxially oriented polyester film which with improved electromagnetic properties compared with prior art films has improved winding performance together with good abrasion properties. The film according to the invention is composed of at least one base layer B and, applied to both sides of this base layer, outer layers A and C, where these film surfaces are defined by the roughness profile gas flow. The film has, furthermore, a haze per unit thickness of <0.4%/μm. The invention further relates to a process for producing the film, and to its use, in particular as a magnetic tape film.

DESCRIPTION OF RELATED ARTS

Because of their excellent mechanical properties, polyester films have long been used as a substrate material for magnetic recording media. An ideal magnetic recording medium with good electromagnetic properties has a very "smooth" surface. However, for good processing performance in the production of the substrate film and in the coating to give the magnetic tape (winding performance), and also subsequently during use of the final product (abrasion resistance), the surface should have some degree of roughness. If monofilms (single-layer films) are used, some compromises have to be accepted in order to meet these intrinsically contradictory requirements. This is because optimizing one of the properties in these films always adversely effects the other property.

Currently, however, there are known coextruded films (AB, ABA and AB') which can be used to create what is known as "dual-surface" characteristics. Using this method, the two film surfaces can be given properties, including roughness and topography, which differ to a limited extent.

EP-A-0 135 451, for example, describes a "dual-surface" film of A/B type, where the two film surfaces have different $R_a$ values. However, a disadvantage of these films is that they cannot be produced cost-effectively, since the two layers (corresponding to two mutually superimposed monofilms) have to be provided with particle systems, and therefore do not permit any cost savings in comparison with monofilms. The quality of the magnetic tape film will be impaired, furthermore, by the regenerated film material (regrind) which arises in all commercial production processes. The regrind must be reused, and it must be incorporated into at least one surface layer of the A/B film. EP-A-0 609 060 and EP-A-0 663 286 achieve an improvement with respect to this quality problem by the principle of A/B/A coextrusion, enabling the effect of the regenerated material on the film surface to be reduced by the screening effect of the two outer layers A. However, ANB/A films outwardly exhibit the character of (thin) monofilms, i.e. the advantage of creating differing surface properties has been lost. However, "dual-surface" characteristics can be regained to a limited extent in ANB/A films through differing thicknesses of the outer layers A. Films of this type are then termed A/B/A' films (which are distinct from A/B/C films). A disadvantage of these films, however, is the limited flexibility which remains in the design of the surface topographies of the two film surfaces. There is, however, no difference in the roughness profile gas flow of the A sides of an A/B/A film. On converting to a A/B/A' film, i.e., on increasing the thickness of one A side, the roughness of the side in question changes, but there is hardly any change in its roughness profile gas flow. The increase in roughness brought about by increasing the layer thickness does not lead to any significant improvement in running properties, since the rise in layer thickness introduced by virtue of the pigments essentially creates only flat-topped elevations. Although they increase the $R_a$ value, they make no contribution toward the object of improving running properties.

A/B/C and A/B/C/B films have been produced and described in a few cases (e.g., EP-A-0 502 745), but here again at least one surface layer comprises regenerated material—with the disadvantages described above—or else the information on A/B/C films is nonspecific (EP-A-0 347 646). The multilayer films disclosed in EP-A-0 502 745 (A/B/C/B and A/B/C films) vary the roughnesses of the film surfaces by changing the particle concentration at constant particle size. This can have only a limited effect on the roughness profile gas flow.

It has already been proposed (German Patent Application file reference 198 14 710.5) that the surface topographies of an at least three-layer film can be controlled by giving it two surfaces composed of outer layers A and C, with a base layer B between these outer layers. The outer layer A has an $R_a$ value of $\leq 15$ nm and an $R_z$ value of $\leq 150$ nm and a number $N_a$ of elevations/protrusions per 0.36 mm² related to their respective heights $h_a$ as follows:

$$A_1 e^{-B_1 \cdot h} \leq N_n \leq A_2 \cdot e^{-B_2 \cdot hn} \quad (1)$$

where $A_1 = 300, \quad A_2 = 7000$ $B_1 = 7.0 \quad B_2 = 8.0$ $0.01 \ \mu m \leq h_a \leq 1.0 \ \mu m$ and the outer layer C has an $R_a$ value which is greater than that of the outer layer A and a number $N_c$ of elevation/protrusions per 0.36 mm² which is related to their respective heights $h_c$ as follows:

$$N_c \leq F \cdot e^{-G \cdot h_c} \quad (2)$$

where F=20,000 and G=9.0
and the haze per unit thickness is <0.4%.

The text in question does not describe films with gas flow values in the roughness profile of >1000 sec and <2000 on surface A and of <600 sec on surface C.

DESCRIPTION OF THE INVENTION

The object of the present invention is to provide a coextruded, biaxially oriented polyester film having more than one layer, and which is suitable as a substrate material for magnetic recording media, and at the same time having a defined (i.e. "smooth") surface A (for good electromagnetic properties in the magnetic tape) and a defined (i.e. "rough") surface C. The defined surface C provides for good winding performance during production of the substrate film (and also during coating on high-speed coating systems), and for good running performance during subsequent operations with the tape (together with low abrasion).

The film should also be cost-effective to produce. Another decisive factor is that the suitability of the films as substrate films should extend to thicknesses of <2.5 μm of the magnetic layer applied to the substrate film. Magnetic tapes with low magnetic layer thicknesses of this type place extremely high requirements upon the topography of the substrate film, since clearly large elevations on the film surface have a more marked effect on the "thin" magnetic layer applied, and this results in poorer electromagnetic properties.

This object is achieved by means of a biaxially oriented, coextruded, at least three-layer polyester film whose two surfaces are formed by outer layers A and C, where between these outer layers there is a base layer B, wherein the outer layer A has a roughness profile gas flow of >1000 sec and <2000 sec and the outer layer C has a roughness profile gas flow of <600 sec.

To achieve good electromagnetic properties in outer layer A, a "smooth" surface is required. For the purposes of the present invention, "smooth" refers not so much to small $R_a$ values, but rather that the outer layer A has high roughness profile gas flow, i.e. low gas flow. The roughness profile gas flow of the outer layer A must be lower than that of the outer layer C.

To achieve good winding performance (running performance in general) and also good abrasion performance, a "rough" reverse side (outer layer C) is required with small gas flow values in the roughness profile, i.e. high gas flow. The roughness profile gas flow of the outer layer C must be greater than that of the outer layer A.

It has proven particularly useful for the roughness profile gas flow of the outer layer A to be >1 100 sec, in particular >1200 sec.

For the outer layer C, it has proven particularly useful for the roughness profile gas flow to be <500 sec, in particular <450 sec.

Preferred haze values per unit of thickness of the novel film are <0.40%112m, particularly preferably ≦0.35%/μm, in particular ≦0.30%/μm.

In the preferred and particularly preferred embodiments, the novel film surprisingly has improved electromagnetic properties and improved winding performance, and also improved running performance during downstream processes at high speeds.

To achieve good electromagnetic properties and also the good winding performance, the outer layers of the novel film comprise pigments. The term "pigment" may be used interchangably with the term "particle." The roughness profile gas flow is usefully controlled by varying the median particle size $d_{50}$. For precise optimization of the gas flow values in the roughness profile the pigment concentration may be varied. Particle sizes ($d_{50}$) of from 0.1 to 0.6 μm, preferably from 0.2 to 0.5 μm, in particular from 0.3 to 0.4 μm for the outer layer (A) have proven useful. For the outer layer (C), particle sizes ($d_{50}$) of from 0.4 to 1.0 μm, preferably from 0.5 to 0.9 μm, in particular from 0.6 to 0.7 μm, have proven useful. If the pigments used are pigments which can agglomerate, such as $Al_2O_3$ or $SiO_2$, "median particle size" means the secondary particle size of these agglomerates. The primary particle sizes of such pigments are usually from 10 to 100 nm. The pigment system used may have a monomodal distribution, or as a mixture of two or more pigment systems, a bimodal or else multimodal distribution. In the case of the bimodal distribution their respective $d_{50}$ values differ. Preference is given to pigments with a narrow particle size distribution.

Pigment concentrations which have proven successful for achieving the gas flow values in the roughness profile of the outer layers A and C are from 1000 to 10,000 ppm, preferably from 2000 to 7000 ppm, in particular from 3000 to 6000 ppm.

According to the invention, the film has at least three layers and has on one side of the layer B (=base layer) the outer layer A and on the other side of the layer B another outer layer C made from polyethylene terephthalate. Both outer layers comprise pigments, which are necessary for achieving the roughness profile gas flows.

In principle, a variety of raw materials may be used for the materials of the various layers. However, the individual layers are preferably prepared using polyester raw materials.

The base layer B of the film is preferably composed of at least 90% by weight of a thermoplastic polyester. Polyesters suitable for this are those made from ethylene glycol and terephthalic acid (=polyethylene terephthalate, PET), made from ethylene glycol and naphthalene-2,6-dicarboxylic acid (=polyethylene 2,6-naphthalate, PEN), made from 1,4-bishydroxymethylcyclohexane and terephthalic acid [=poly (1,4-cyclohexanedimethyleneterephthalate), PCDT], or also made from ethylene glycol, naphthalene-2,6-dicarboxylic acid and biphenyl-4,4'-dicarboxylic acid (=polyethylene 2,6-naphthalate bibenzoate, PEMBB). Particular preference is given to polyesters which are composed of at least 90 mol %, preferably at least 95 mol %, of ethylene glycol units and terephthalic acid units, or of ethylene glycol units and naphthalene-2, 6-dicarboxylic acid units. The remaining monomer units derive from other aliphatic, cycloaliphatic, or aromatic diols and, respectively, dicarboxylic acids, as may also be present in the layer A (or the layer C).

Examples of other suitable aliphatic diols are diethylene glycol, triethylene glycol, aliphatic glycols of the general formula HO—$(CH_2)_n$—OH, where n is an integer from 3 to 6 (in particular 1,3-propanediol, 1,4-butanediol, 1,5-pentanediol and 1,6-hexanediol) or branched aliphatic glycols having up to 6 carbon atoms. Among the cycloaliphatic diols, mention should be made of cyclohexanediols (in particular 1,4-cyclohexanediol). Other suitable aromatic diols have, for example, the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$CH_4$—OH are also highly suitable.

Other preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids, mention should be made of cyclohexanedicarboxylic acids (in particular cyclohexane-1,4-dicarboxylic acid). Particularly suitable aliphatic dicarboxylic acids are the ($C_3$–$C_{19}$) alkanedioic acids, where the alkane moiety may be straight-chain or branched.

The polyesters may be prepared by the transesterification process. The starting materials are dicarboxylic esters and diols, which are reacted with the usual transesterification catalysts, such as salts of zinc, of calcium, of lithium, of magnesium or of manganese. The intermediate products are then polycondensed in the presence of well-known polycondensation catalysts, such as antimony trioxide or titanium salts. The direct esterification process in the presence of polycondensation catalysts is equally suitable for this preparation, starting directly from the dicarboxylic acids and the diols.

Processes which have proven advantageous are those in which transesterification catalysts are used which create only a few and/or only small elevations /protrusions on the surface of the film. Particular preference is given here to magnesium salts and manganese salts. These transesterification catalysts are advantageously used in the preparation of the base raw material, but particularly advantageously during the preparation of the raw material for the outer layers.

In principle, the polymers used for the outer layers may be the same as those used for the base layer. In addition, other materials may also be present in the outer layers, and the outer layers are then preferably composed of a mixture of polymers, a copolymer or a homopolymer which comprises ethylene-2,6-naphthalate units and ethylene terephthalate units. Up to 10 mol % of the polymers may be composed of other comonomers (see above).

For any intermediate layers which may be present, the polymers used may in principle be those already described for the base layer and the outer layers.

The base layer and the other layers may also comprise conventional additives, such as stabilizers and/or antiblocking agents. They are may be added to the polymer or to the polymer mixture before the melting process. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, alumina, LiF, the calcium, barium, zinc or manganese salts of the dicarboxylic acids used, carbon black, titanium dioxide, kaolin, crosslinked polystyrene particles, or crosslinked acrylate particles.

The additives selected may also be mixtures of two or more different antiblocking agents or mixtures of antiblocking agents of the same makeup but different particle size. The particles may be added to the individual layers in advantageous concentrations for each case, for example via masterbatches during extrusion. Masterbatch pigment concentrations of from 0.1 to 5% by weight have proven particularly suitable. A detailed description of the antiblocking agents which can be used may be found, for example, in EP-A-0 602 964.

In the base layer of the novel film there are no pigments introduced via masterbatches. The introduction of regenerated material (=recyclable film residues) implies that controlled or, respectively, small amounts of the abovementioned pigments may be present in the base layer. Proportions of regenerated material which have proven particularly advantageous are from 20 to 60% by weight, (based on the weight of the base layer).

The novel polyester film has at least three layers and comprises the two outer layers A and C. The thickness and makeup of the second outer layer C may be selected independently of the outer layer A. The second outer layer may also comprise the abovementioned polymers or polymer mixtures, but these do not have to be identical to those of the first outer layer. The second outer layer may also comprise other well known outer layer polymers. The thicknesses of the two outer layers are preferably identical. The advantage of the novel film is specifically that the different gas flow values in the roughness profile of the film surfaces can be adjusted by controlled variation of the particle size and, if desired, of the concentration and of the polymers, while the outer layer thickness remains essentially identical.

Between the base layer and the outer layers there may, if desired, also be an intermediate layer. This may again be composed of the polymers described for the base layer. In a particularly preferred embodiment it is composed of the polyesters used for the base layer. It may also comprise the additives described for the outer layers. The thickness of the intermediate layer is generally of the same order as the outer layer thicknesses.

In the novel three-layer film the thicknesses of the outer layers A and C are generally greater than 0.2 $\mu$m and are in the range from 0.3 to 2.5 $\mu$m, preferably in the range from 0.5 to 2.0 $\mu$m, particularly preferably in the range from 0.7 to 1.8 $\mu$m, and the thicknesses of the outer layers A and C may be identical or different. They are preferably essentially identical.

The total thickness of the novel polyester film may vary within wide boundaries. It is from 5 to 40 $\mu$m, in particular from 7 to 20 $\mu$m, preferably from 9 to 15 $\mu$m.

To produce the layers A and C (outer layers A and C), pellets of polyethylene terephthalate are, in each case, fed to an extruder. The materials are melted at about 300° C. and extruded.

The polymers for the base layer are usefully fed via another extruder. Any foreign bodies or contamination which may be present can be filtered off from the polymer melt prior to extrusion. The melts are then extruded through a coextrusion die to give flat melt films and laid one upon the other. A coextruded film is then drawn off and cooled with the aid of a chill roll and, if desired, cooled and solidified over further rolls.

The biaxial orientation procedure is generally carried out sequentially. For this, the first orientation is preferably longitudinal (i.e., in the machine direction), and is followed by transverse orientation (i.e., perpendicular to the machine direction). This orients the molecular chains. The longitudinal orientation procedure can be carried out with the aid of two rolls running at different speeds corresponding to the stretching ratio desired. The transverse orientation procedure usually utilizes an appropriate tenter frame.

The temperature for the orientation procedure may vary over a relatively wide range and depends on the film properties desired. The longitudinal stretching procedure is generally carried out at from 80 to 130° C., and the transverse stretching procedure at from 90 to 150° C. The longitudinal stretching ratio is generally from 2.5:1 to 6:1, preferably from 3:1 to 5.5:1. The transverse stretching ratio is generally from 3.0:1 to 5.0:1, preferably from 3.5:1 to 4.5:1.

Prior to the transverse stretching procedure, one or both surfaces of the film may be in-line coated by known processes. The in-line coating may, for example, give improved adhesion of the magnetizable layer, or else improve antistatic performance or processing performance.

In the heat-setting procedure which follows, the film is held at a temperature of from 150 to 250° C. for from 0.1 to 10 sec. The film is then wound up in a usual manner.

One or both sides of the biaxially stretched and heat-set polyester film may be corona- or flame-treated prior to application of the magnetizable layer. The intensity of treatment selected is such that the surface tension of the film is in general above 45 mN/m.

Magnetizable layers, if required, are applied using conventional industrial systems.

An advantage of the invention is that the production costs of the novel film are lower than those of the prior art. The properties of the novel film relevant to its processing and use are tailored to the properties desired. The film wastes arising during production of the film are recycled in the form of regenerated material without sacrificing quality.

The film is highly suitable as a substrate film for magnetic tapes, in particular those whose magnetic layer thickness is <2.5 µm. The structuring of the surface according to the invention results in no, or only insignificant, modulation of the magnetic layer, and this means that the tapes have excellent electromagnetic properties.

In summary, the novel film has good electromagnetic properties together with high abrasion resistance. It also has the desired good processing performance, in particular excellent slittability and winding properties.

The table below (Table 1) demonstrates important film properties according to the invention.

TABLE 1

| | Range according to the invention | Preferred | Particularly preferred | Unit | Test method |
|---|---|---|---|---|---|
| Gas flow (outer layer A) | >1000 >2000 | >1100 <2000 | >1200 <2000 | sec. | as described |
| Gas flow (outer layer C) | <600 | <500 | <450 | sec. | as described |
| Haze per unit thickness | 0.4 | 0.35 | 0.3 | | |

The following methods were used to characterize the raw materials and the films:

Determination of Roughness

The roughness $R_a$ of the film was determined to DIN 4762 with a cut-off of 0.08 mm.

| Apparatus | Perthometer SP8 (Hommel) on glass plate |
|---|---|
| Scanner | RFHTB-50 with runner |
| Pin diameter | 5 µm |
| Force applied | 0.4 mN |
| Spacing runner | −25 mm |

Determination of Haze Per Unit Thickness

The haze of the film was determined to ASTM-D 1003-61 (measurement method A) with a BYK Gardner Hazemeter XL-211. The haze per unit thickness is given by $$\frac{\text{Haze}}{\text{Total film thickness}} \frac{\%}{\mu m}$$

Surface Gas Flow Time

The principle of the test method is based on the airflow between one side of the film and a smooth sheet of silicon wafer. The air flows from the surroundings into an evacuated space, and the interface between film and sheet of silicon wafer acts as a flow resistance.

A round specimen of film is placed on a sheet of silicon wafer in the middle of which there is a hole providing the connection to the receiver. The receiver is evacuated to a pressure below 0.1 mbar. The time [sec.] which the air takes to establish a pressure rise of 56 mbar in the receiver is determined.

Test Conditions:

| Tent area: | 43.1 cm² |
|---|---|
| Application weight | 1276 g |
| Air temperature | 23° C. |
| Humidity | 50% relative humidity |
| Air pressure | 1 bar |
| Aggregated gas volume | 1.2 cm³ |
| Pressure difference | 56 mbar |

Measurement of Winding Performance

There is no standard test method which could be utilized for measuring winding performance. Winding performance could be evaluated by observing the film during winding up to give a machine roll with machine parameters generally set at constant values and a winding rate of 380 meters.

If winding performance was poor, it could be clearly seen that the film was "floating" across its entire width. Good winding performance was seen in that the film could be smoothly wound across its entire width and no floating was observed. The speed could even be increased to 450 meters without creating problems.

| Width of the machine roll: | 5.6 m |
|---|---|
| Observed run length: | at least 20,000 m |

Determination of Electromagnetic Properties (EMP)

Electromagnetic properties were determined to DIN TEC 60 B (CO) 69. In each case, coextrusion side A (smooth side) of the film produced was magnetically coated by conventional and known processes, calendered, and assessed to determine electromagnetic properties. The thickness of the magnetic layer was typically from 1.8 to 2.0 µm.

EXAMPLES 1 AND 2

Chips of polyethylene terephthalate (produced by the transesterification process with Mn as transesterification catalyst, Mn concentration: 100 ppm) and recycled material of the same type with a "general" particle concentration of 1150 ppm ($CaCO_3$<1.0 µm; $Al_2O_3$ 0.06 µm) were dried at 135° C. to a residual moisture of less than 50 ppm and fed to the extruder for base layer B.

In addition, mixtures of chips of polyethylene terephthalate (prepared by the transesterification process using Mn as transesterification catalyst, Mn concentration: 100 ppm) which have been pigmented as in Table 2 are fed undried to the respective twin-screw extruders for the outer layers A and C.

Coextrusion followed by a stepwise orientation procedure in longitudinal and transverse directions was used to produce a transparent three-layer A/B/C film with an overall thickness of 15 µm.

Base Layer B:

50.0% by weight of polyethylene terephthalate with an SV of 770

50.0% by weight of recycled material with an SV of 730

The process conditions for the individual steps were:

| Extrusion: | Temperatures: | Layer A: | 290° C. |
|---|---|---|---|
| | | Layer B: | 290° C. |
| | | Layer C: | 290° C. |

-continued

| Longitudinal stretching: | Temperature: Longitudinal stretching ratio: | 80–125° C. 4.7 |
|---|---|---|
| Transverse stretching: | Temperature: Transverse stretching ratio: | 80–135° C. 4.0 |
| Heat-setting: | Temperature: | 210–225° C. |

COMPARATIVE EXAMPLES 3, 4 AND 5

The procedure for Comparative Examples 3, 4 and 5 was as given in technical description of Examples 1 and 2. The pigmentation of the outer layers A and C is given in Table 2.

TABLE 2

| | Coextrusion A CaCO₃ | | Coextrusion C | | |
|---|---|---|---|---|---|
| | | | CaCO₃ | | Al₂O₃ $d_{50}$–0.06 μm |
| Example | $d_{50}$[μm] | % | $d_{50}$[μm] | % | % |
| 1 | 0.4 | 0.45 | 0.7 | 0.55 | 0.3 |
| 2 | 0.4 | 0.35 | 0.7 | 0.5 | 0.1 |
| 3 (Comp.) | 0.7 | 0.3 | 0.7 | 0.5 | 0.45 |
| 4 (Comp.) | 0.6 | 0.45 | 0.4 0.7 | 0.5 0.1 | 0.45 |
| 5 (Comp.) | 0.6 | 0.25 | 0.7 | 0.5 | 0.1 |

Examples 1 and 2 and Comparative Examples 3, 4 and 5 (thickness of layers A = C = 1 μm, B = 13 μm)
Percentages are % by weight Table 3 clearly shows that films whose gas flow values in the roughness profile are within the range according to the invention (Examples 1 and 2) have excellent electromagnetic properties together with good winding properties. On checking the test time for roughness profile gas flow it is clear how this affects the electromagnetic properties for the layer A, and also the winding properties (or, respectively, the running performance) for the layer C. The inventive examples showed marked improvements in electromagnetic properties and winding performance, as compared with Comparative Examples 3–5.

The abrasion properties of the novel films lie within a favorable range.

TABLE 3

| Example No. | Ra/Rz (A) (nm) | Ra/Rz (C) (nm) | Gas flow value sec. | Haze per unit thickness | EMP | Winding performance |
|---|---|---|---|---|---|---|
| 1 | 10/69 | 15/118 | 1300/380 | 0.23 | + | good |
| 2 | 9/62 | 14/105 | 1550/380 | 0.21 | ++ | good |
| 3 (Comp.) | 11/79 | 13/103 | 543/374 | 0.22 | -- | good |
| 4 (Comp.) | 11/72 | 11/94 | 540/735 | 0.21 | - | poor |
| 5 (Comp.) | 9/70 | 13/102 | 850/356 | 0.20 | 0 | good |

The properties from Examples 1 and 2 and Comparative Examples 3, 4 and 5
-- very poor
- poor
0 standard
+ good
++ very good The comparative examples confirm that films of the prior art do not achieve the objects of the invention.

What is claimed is:

1. a biaxially oriented coextruded polyester film which has at least three layers, comprising:
   (A) at least one base layer B; and
   (B) two outer layers A and C,
wherein the outer layer A has a roughness profile gas flow of >1000 sec and <2000 sec, and the outer layer C has a roughness profile gas flow of <600 sec.

2. A film as claimed in claim 1, wherein the composition and thickness of layers A and C are, independently, the same or different.

3. A film as claimed in claim 1, wherein the outer layers A and C comprise particles that affect the roughness profile gas flow.

4. A film as claimed in claim 3, wherein the outer layers A and C comprise particles at a concentration of, in each case, from about 500 to about 10,000 ppm, based on the weight of the respective outer layer.

5. A film as claimed in claim 3, wherein the median particle size $d_{50}$ of the particles in the outer layer A is from about 0.1 to about 0.6 μm.

6. A film as claimed in claim 3, wherein the median particle size $d_{50}$ of the particles in the outer layer A is from about 0.2 to about 0.5 μm.

7. A film as claimed in claim 3, wherein the median particle size $d_{50}$ of the particles in the outer layer A is from about 0.3 to about 0.4 μm.

8. A film as claimed in claim 3, wherein the median particle size $d_{50}$ of the particles in the outer layer C is from about 0.4 to about 1.0 μm.

9. A film as claimed in claim 3, wherein the median particle size $d_{50}$ of the particles in the outer layer C is from about 0.5 to about 0.9 μm.

10. A film as claimed in claim 3, wherein the median particle size $d_{50}$ of the particles in the outer layer C is from about 0.6 to about 0.7 μm.

11. A film as claimed in claim 3, wherein the roughness profile gas flow of outer layers A and C is adjusted by varying the median particle sizes $d_{50}$ of the particles in outer layers A and C.

12. A film as claimed in claim 1, wherein the thicknesses of outer layers A and C are the same or different and are, independently, greater than about 0.2 μm.

13. A film as claimed in claim 1, wherein the thicknesses of outer layers A and C are the same or different and are, independently, from about 0.3 to about 2.5 μm.

14. A film as claimed in claim 1, wherein the thicknesses of outer layers A and C are the same or different and are, independently, from about 0.5 to about 2.0 μm.

15. A film as claimed in claim 1, wherein the thicknesses of outer layers A and C are the same or different and are, independently, from about 0.7 to about 1.8 μm.

16. A film as claimed in claim 1, wherein the thickness of the entire film is from about to about 40 μm.

17. A film as claimed in claim 1, wherein the thickness of the entire film is from about 7 to about 20 µm.

18. A film as claimed in claim 1, wherein the thickness of the entire film is from about 9 to about 15 µm.

19. A film as claimed in claim 1, wherein the base layer B comprises recycled film material.

20. A film as claimed in claim 1, further comprising one or more additional additives.

21. A film as claimed in claim 20, wherein the additional additives are stabilizers and/or antiblocking agents.

22. A process for producing a biaxially oriented coextruded polyester film as claimed in claim 1, comprising:

(A) feeding polyester melts corresponding to the makeups of the outer and base layers to a coextrusion die;

(B) extruding the result from step (A) onto a chill roll; and (C) biaxially orienting and heat-setting the resultant prefilm, wherein the outer layer A has a roughness profile gas flow of >1000 sec and <2000 sec, and the outer layer C has a roughness profile gas flow of <600 sec.

23. The process of claim 22, wherein the biaxial orientation of the film is carried out sequentially.

24. The process of claim 22, wherein the sequential biaxial orientation is carried out by first orienting the film in a longitudinal direction, and then in a transverse direction.

25. The process of claim 24, wherein at least one surface of the film undergoes an in-line coating step prior to the transverse stretching procedure.

26. The process of claim 22, wherein the biaxially oriented and heat set film is subsequently corona or flame treated.

27. A magnetic recording medium comprising a film as claimed in claim 1 and a magnetizable layer applied to a surface of the film.

28. A magnetic recording medium as claimed in claim 27, wherein the magnetizable layer has been applied to the outer layer A.

29. A method for making a magnetic recording medium, comprising preparing the magnetic recording medium with a film as claimed in claim 1.

30. A method for making a thermal transfer ribbon, comprising preparing a thermal transfer ribbon with a film as claimed in claim 1.

* * * * *

UNITED STATES PATENT AND TRADEMARK OFFICE
CERTIFICATE OF CORRECTION

PATENT NO. : 6,238,782 B1
DATED : May 29, 2001
INVENTOR(S) : Joerg Hellmann et al.

It is certified that error appears in the above-identified patent and that said Letters Patent is hereby corrected as shown below:

Title page,
Item [73], Assignee, change "Wisebaden" to -- Wiesbaden --.

Column 10,
Line 16, change "a biaxially" to -- A biaxially --.
Line 67, after "is from about", insert -- 5 --.

Column 11,
Line 2, change "7to" to -- 7 to --.

Signed and Sealed this

Fourteenth Day of May, 2002

Attest:

JAMES E. ROGAN
Attesting Officer    Director of the United States Patent and Trademark Office